Jan. 2, 1968   C. B. V. NEILSON ET AL   3,361,180
TIRE DEFLATING CONTROL MEANS

Filed June 24, 1965   6 Sheets-Sheet 1

FIG.1.

Inventors:
Christopher Bernard Vere Neilson
and
Kenneth Frederick Henson
BY Baldwin & Wight
Attorneys

FIG.5.

United States Patent Office 3,361,180
Patented Jan. 2, 1968

3,361,180
TIRE DEFLATING CONTROL MEANS
Christopher Bernard Vere Neilson, Frodsham, and Kenneth Frederick Henson, Cheshire, England, assignors to Electro-Hydraulics Limited, Warrington, England, a corporation of the United Kingdom
Filed June 24, 1965, Ser. No. 466,713
14 Claims. (Cl. 152—415)

This invention relates to aircraft and concerns aircraft wheel and tire assemblies.

It is a known requirement for certain types of aircraft that they should be able to operate from prepared airfields having, for example, concrete runways and also from unprepared landing strips, for example, fields or sandy desert. This is the case particularly for certain military aircraft including transport aircraft for use in forward areas. The requirements are conflicting in that an aircraft operating from a prepared hard surface can use appreciably higher tire inflation pressures than the same aircraft operating from unprepared or soft landing strips. The much greater tire deflections of the lower inflation pressures are injurious to tire life. Hitherto, if an aircraft has been required to take off from a prepared hard surface and land on an unprepared or soft landing strip, the disadvantages of reduction of all up weight and low pressure, low life, tires have had to be accepted. To meet these requirements with military aircraft, it will usually be the case that the aircraft will take off fully loaded from the prepared runway. Its weight will be appreciably less for landing on the unprepared landing strip, due to the weight of fuel consumed in transit; furthermore, on the return journey to a prepared runway, it is unlikely to be fully loaded. If the aircraft starts off with tires inflated at low pressure to enable a landing to be made on an unprepared landing strip, the loaded weight must be reduced to enable the aircraft to take off safely from the prepared runway.

The object of this invention is to provide an aircraft wheel and tire assembly, which will enable an aircraft to take off fully laden with tires inflated at high pressure and which will allow the tires to be partially deflated, to a predetermined pressure, prior to landing of the aircraft on an unprepared landing strip.

This invention also has application, in particular, for long range aircraft operating between prepared hard runways, on which it is desired to have high pressure in the tires for maximum take-off weight, but with which it is desired to make full use of the tires flexibility, when inflated to a relatively low pressure, for landing. The taxiing characteristics on landing will also be improved with the tires inflated at a lower pressure than for take-off at maximum weight.

According to this invention, in an aircraft wheel and tire assembly which is dynamically balanced, means are included selectively operable to deflate the tire to a predetermined pressure.

Preferably, for each wheel and tire assembly of an aircraft, fluid pressure control valve means is provided connectable to said tire by electrically operable valve means.

The fluid pressure control valve means and the electrically operable valve means are preferably separate components secured to the wheel, the whole assembly being dynamically balanced. Alternatively the two valve means may be provided in a single unit fitted concentrically on the wheel and dynamically balanced, or fitted eccentrically, additional mass being provided for dynamic balancing of the whole wheel, tire and valve means assembly.

Conveniently an electrical feed to the solenoid operated valve can be taken through slip rings on the wheel axle and brush gear on the wheel.

The invention will now be described with reference to the accompanying drawings, in which.

Figure 1:
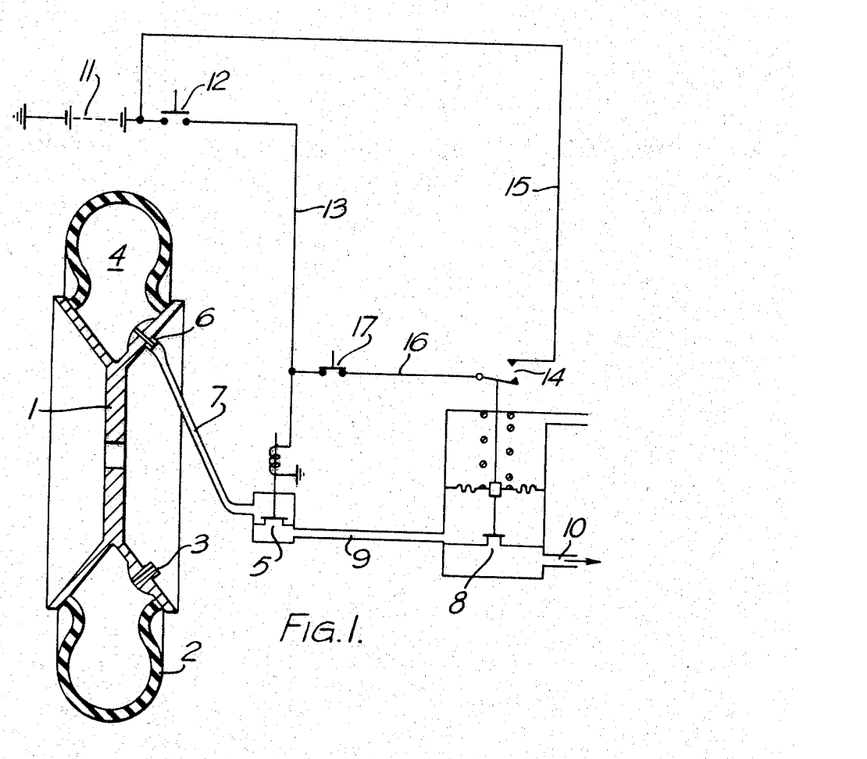
FIGURE 1 is a diagrammatic representation of an aircraft wheel and tire assembly and an electrical circuit therefor.

Referring to FIGURE 1, an aircraft wheel 1 has a tire 2 and an inflation connection 3. The pressure chamber 4 of the tire 2 is connected to a normally closed solenoid valve 5 via a connection 6 and a conduit 7. The outlet from the solenoid valve 5 is connected to a pressure reducing valve 8 by a conduit 9, the pressure reducing valve 8 discharging to atmosphere via a conduit 10.

A source of electrical energy, as shown, a battery 11, is connected on one side to earth and on the other side to one contact of a normally open switch 12. The other contact of the switch 12 is connected by a conductor 13 to one side of the solenoid of the valve 5, the other side being earthed. Normally open contacts 14, operable by the valve 8, are connected respectively between the battery 11 and the solenoid of the valve 5 by conductors 15, 16 respectively, the latter through a normally closed switch 17.

The assembly is operated in the following manner:

The aircraft takes off with the tire 2 inflated to a high pressure. If the pilot requires to land on an unprepared landing strip, he operates the switch 12 momentarily to energise the solenoid and open the valve 5. The pressure reducing valve 8 will have been set for a lower pressure and consequently it will now open, closing the contacts 14, which provide a holding circuit to keep the solenoid energised. When the tire pressure has reduced to the lower pressure, the valve 8 closes, thus opening the contacts 14 and de-energising the solenoid, so that the valve 5 also closes. This allows the tire to be deflated to the required pressure for a safe landing on an unprepared landing strip.

The normally closed switch 17 is provided to enable the pilot to override the pressure reducing valve 8; thus, if he suspects malfunctioning of the valve 8 or the contacts 14, he can open the switch 17 to de-energise and close the solenoid valve 5, thus preventing further deflation of the tire.

As described, the tire is automatically deflated to the required pressure after operation of the switch 12 leaving both valves 5, 8 closed. Alternatively, and if desired, energisation and de-energisation of the solenoid can be under the direct control of the pilot.

Indicating means, for example, a pressure operated switch and lamp can be provided to indicate to the pilot partial deflation of the tire.

The invention will now be described in detail with reference to FIGURES 1, 2, 3(a), 3(b), 3(c), 4 and 5. It will be noticed that parts already described with reference to FIGURE 1 have different reference numerals in the FIGURES 2, 3(a), 3(b), 3(c), 4 and 5.

Referring to the accompanying drawings, especially FIGURES 3(a) and 3(b) an aircraft wheel 20 of conventional construction comprises two wheel halves 21, 22 connected together as by bolts 23, only one of which is shown, and sealing rings are provided at 24a, 24b, 24c where the two halves of the wheel are required to meet in a fluid pressure tight manner. The wheel 20 is mounted on an axle 25 by inner and outer bearings, of which the outer bearing only is shown at 26. The usual inflation connection 27 is provided in the wheel rim 28. The rib 29 of the wheel half 21 contains a passage 30, the outer end of which communicates, via a filter 31, for example, a sintered metal filter, with the tire pressure chamber. The inner end of the passage 30 connects with a chamber 32 in which is located a normally closed solenoid operated valve, generally indicated at 33.

The solenoid operated valve 33, shown in FIGURE 3(b), includes a seat member 34 provided with fluid pressure seals 34a, 34b and having an inlet port 35 which is closed by a valve member or element 36 under the action of a compression spring 37. A guide member 38 is screwed into the seat member 34, a fluid pressure seal being provided at 39. A solenoid coil 40 is located between the guide member 38 and a core member 41 and is secured in position by a shroud 42 secured between the guide member 38 and the core 41. The guide member 38 is secured to the wheel half 21 by screws 43. A port 44 is provided in the seat member 34 and is connected to an annular passage 45 by a drilling 46.

Figures 3, 4:
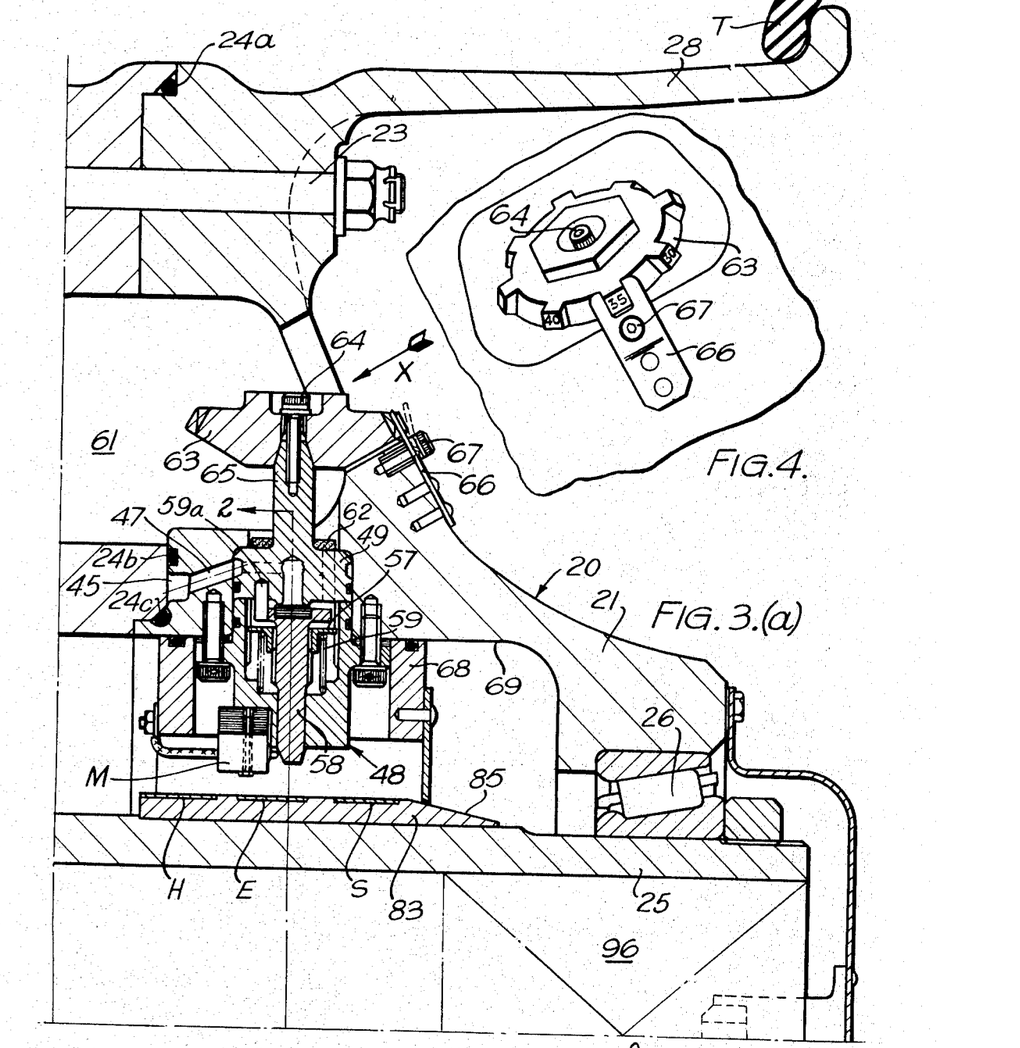
FIGURE 4 is a scrap view in the direction of the arrow X in FIGURE 3(a), showing part of the adjusting means shown in FIGURE 3(a) and, FIGURE 5 is an electrical circuit diagram.
Figure 3:
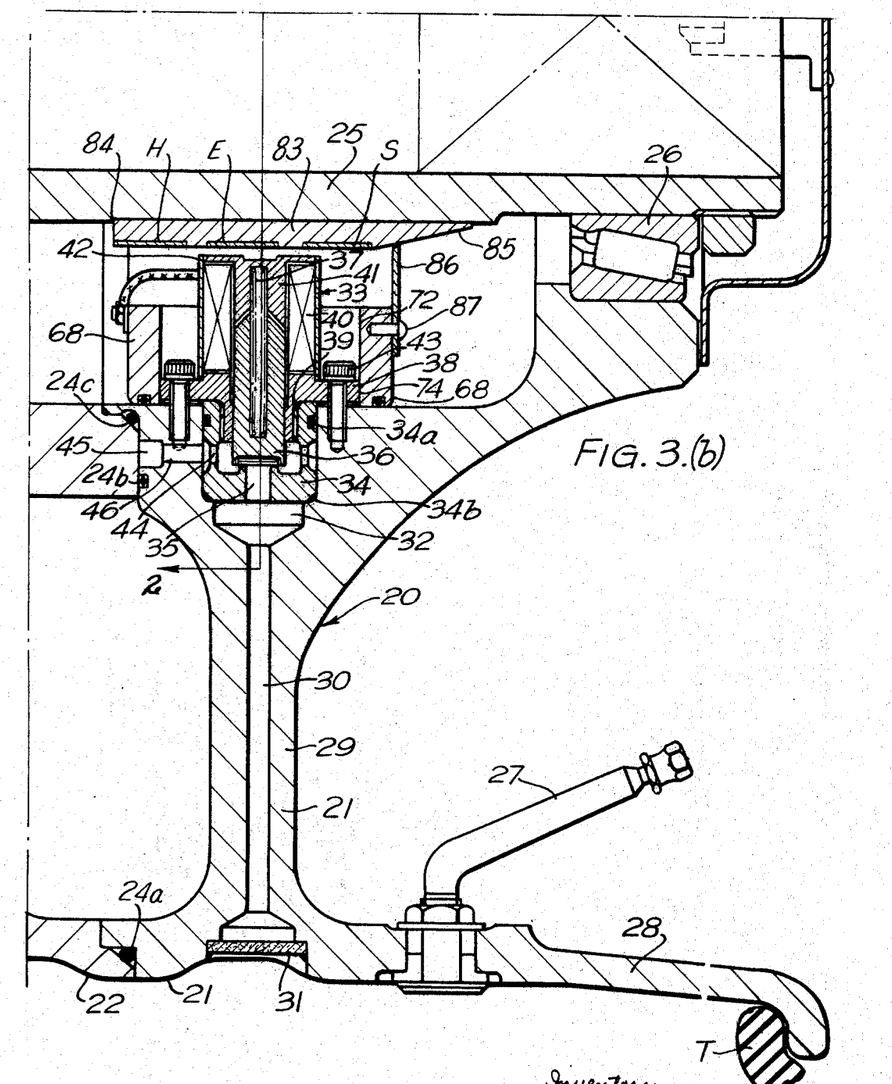
FIGURE 3(a) is a partial enlarged scale section on the line 3(ab)—3(ab) of FIGURE 2.
FIGURE 3(b) is a partial enlarged scale section on the line 3(ab)—3(ab) of FIGURE 2, FIGURES 3(a) and 3(b) together showing part of an aircraft wheel incorporating the valve means for controlling deflation of the tire on the wheel.
FIGURE 3(c) is an enlarged scrap view showing the pressure control valve of FIGURE 3(a)
Figure 3C:
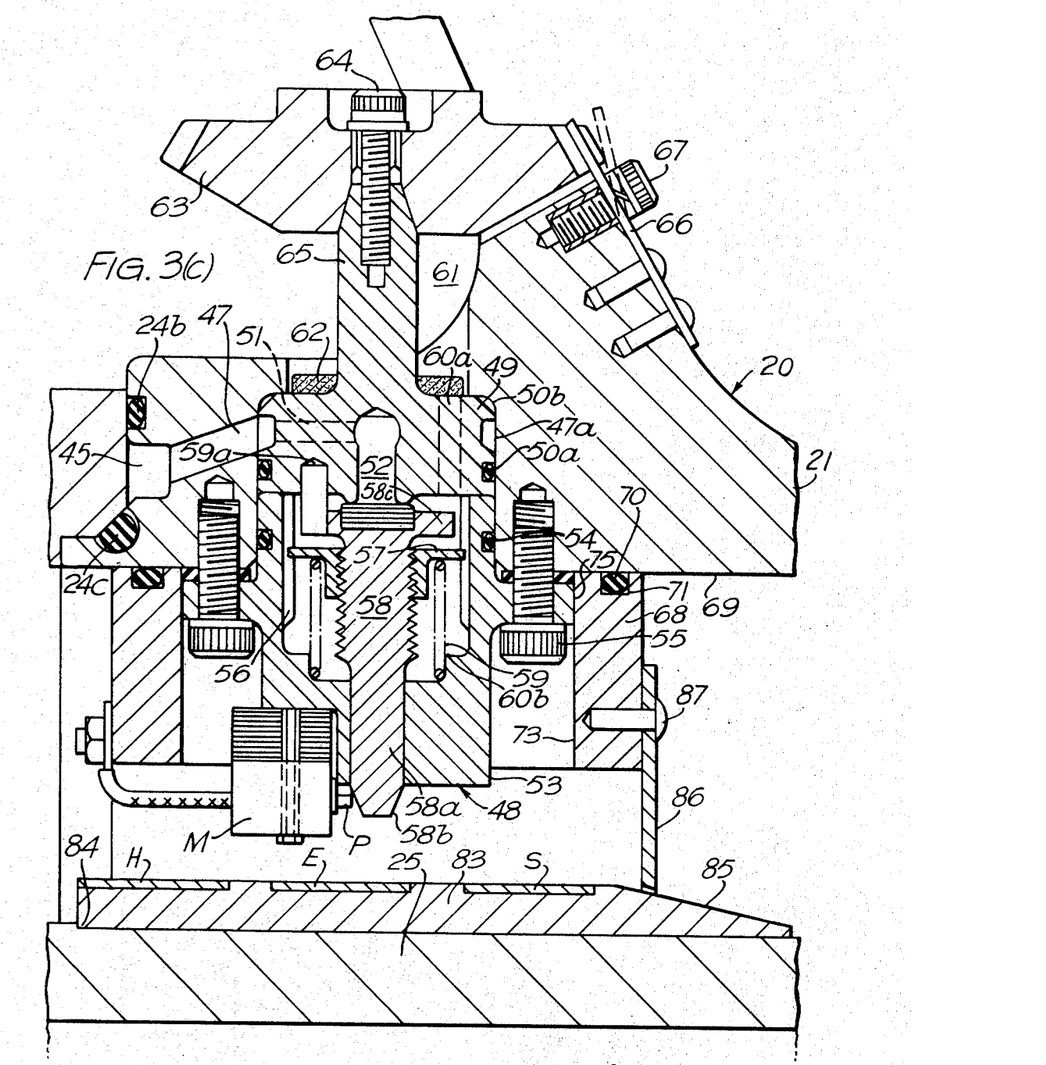

Referring now in particular to FIGURE 3(c), drilling 47 connects the annular passage 45 to a chamber 47a of a pressure maintaining valve, generally indicated at 48, containing a seat member 49, fluid pressure seals being provided at 50a, 50b. The seat member 49 has a drilling 51 which connects the chamber 47a with an inlet port 52. A cap member 53 is located in the chamber 47a, a fluid pressure seal being provided at 54, and is secured to the wheel half 21 as by screws 55. The cap member 53 has splines 56 along which a flanged member 57, having co-operating splines, can slide, the arrangement being such that flanged member 57 cannot rotate with respect to cap member 53.

The flanged member 57 has screw threaded engagement with a valve member or element 58 and a spring 59 is arranged between the cap member 53, and the flanged member 57 so as to urge the valve member 58 into sealing engagement with the seat surrounding the port 52 in the seat member 49. Pegs 59a are secured in the seat member 49 and the valve member 58 has recesses cut in a flange 58c thereof to receive the pegs 59a so that the valve member 58 can move longitudinally relative to the seat member 49 but cannot rotate relatively thereto.

The amount of fluid pressure required to lift the valve member 58 off its seat may be varied by rotating the valve member 58 relatively to the flanged member 57 which causes the latter to move along the valve member 58, thereby varying the compressive loading of the spring 59. Rotation of the valve member 58 is effected by means of a setting member, as shown a hand wheel 63 secured by a screw 64 to a stem 65 on the seat member 49. Rotation of the seat member 49 acts through the pegs 59a to rotate the valve member 58 relatively to the flanged member 57, the splines 56 preventing the flanged member from rotating. The hand wheel 63 is releasably held in adjusted position by a locking plate 66 held in locking position by a screw 67. The locking plate 66 has a forked end adapted to receive a selected one of a plurality of projections on the hand wheel 63, each marked with a graduation to indicate the pressure release setting of the valve spring 59.

The valve member 58 has a stem 58a with a cam portion 58b which bears on a plunger P of a microswitch M which is secured to the cap member 53. When the valve member 58 lifts from the seat member 49, movement of the cam causes the plunger P to close the contacts of the microswitch M. Similarly, when the valve member 58 closes on to the seat member 49, the contacts of the microswitch M return to the open position.

A drilling 60a passes through the seat member 49 to connect the chamber 60b inside the cap member 53 with a vent or exhaust to atmosphere 61, via a filter 62 which can conveniently be a press fit on the stem 65 on the seat member 49.

Referring now to FIGURES 2, 2(a), 3(a), 3(b) and 3(c), of the accompanying drawings, a commutator ring 68 is centred in the bore 69 of the wheel half 21 by locating rings 70, for example rubber O rings, in grooves 71. The commutator ring 68, preferably a plastic moulding having electrical insulating properties, has two diametrically opposite holes 72, 73 moulded or machined therein for reception of flanges 74, 75 of the solenoid operated valve 33 and the pressure maintaining valve 48 respectively and the commutator ring 68 is driven by engagement with the flanges 74, 75 which, as already described, are secured to the wheel half 21 by screws 43, 55, the flanges engaging in spot faced portions 74a, 75a (FIGURE 2) of the wheel half 21.

Figure 2:
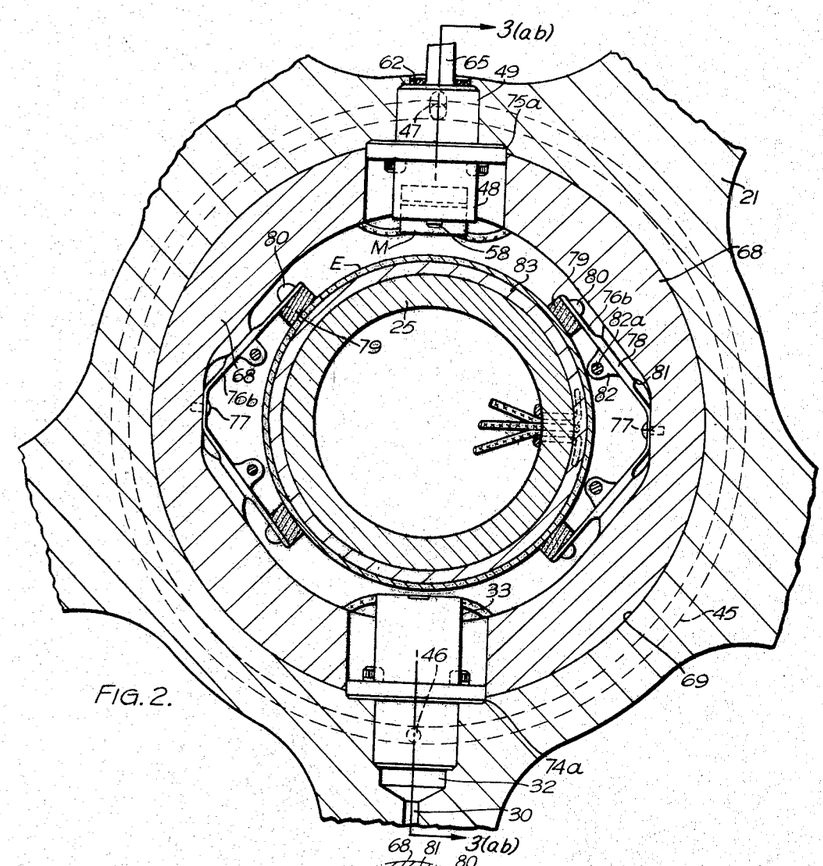
FIGURE 2 is a sectional view on the line II—II of FIGURES 3(a) and 3(b) considered together through an aircraft wheel axle and wheel thereon showing the valve means (in outline only), a slip ring and brushes.
Figure 2A:
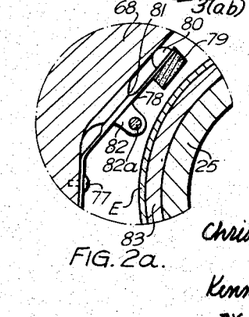
FIGURE 2(a) is a scrap view showing a brush of FIGURE 2 in its raised position away from the slip ring.

Three sets of diametrically opposed pairs of brushes 76a, 76b, 76c only one set (76b) of which is shown in FIGURE 2, are secured to the commutator ring 68 as by pins 77. Each set of brushes comprised two leaf-springs 78 formed in the shape of a V with a flat base through which the pin 77 is passed to secure it to the commutator ring 68. To the end of each leaf spring arm, on opposite sides thereof, are secured a brush 79 and a stop 80.

The stop 80 is also provided with such mass that, above a predetermined rotational speed of the wheel for example, an aircraft speed of 15 to 20 knots, the centrifugal force due to the mass of the associated brush and stop causes the brush to lift clear of its associated slip ring (see FIGURE 2a), thus electrically isolating the components connected to the brushes from the slip ring. Each leaf spring 78 is provided with downturned flanges 81 which serve to locate and guide the springs for movement between pairs of lugs 82 which are integral with the commutator ring 68. A pin 82a passes through holes in each pair of lugs 82 so as to limit the inward movement of the leaf springs 78 and facilitate assembly of the wheel on the axle 25. Electrical conducting wires are embedded in the commutator ring 68 to connect the brushes of each set to terminals for connection to the coil 40 of the solenoid operated valve 33 and the microswitch M in a manner to be described.

An electrically insulated sleeve 83, which contains three slip rings H, E and S is pressed onto the wheel axle 25 and is located by a shoulder 84. An electrical lead from each slip ring is taken through the axle as shown in FIGURE 2. The sets of brushes 76a, b, c secured to the commutator ring 68 are arranged so that one set bears on each slip ring. It will be noted that the sleeve 83 has a chamfered portion 85 and that a plate 86 is provided which is secured to the commutator ring 68 by pins 87 to prevent access of lubricant from the bearing 26 on to the slip rings. The chamfered portion 85 provides a lead to deflect the brushes outwardly so that they are not damaged when the complete tire and wheel assembly is fitted on the axle.

The solenoid operated valve 33 and pressure maintaining valve 48 are designed to be of approximately the same weight, provision (not shown) being made, for example, by a tapped hole, to receive a balance weight plug in part of the valve body, for example in the cap member 53, so as to provide close weight adjustment. The holes 72, 73 in the commutator ring 68 are arranged diametrically opposite one another so that the commutator ring is substantially balanced before assembly and final balancing adjustment only is required.

The valves are assembled in the wheel half 21 in the following manner. The commutator ring 68, complete with the plate 86 and the locating rings 70, is inserted in the bore 69 with the holes 72, 73 aligned with the chambers 32, 47a respectively which receive the valves. The solenoid operated valve 33 is inserted and secured by the screws 43. The pressure maintaining valve 48, without the handwheel 63, is next inserted and secured by the screws 55. The annular passage 45 is sealed by a test plate and air under pressure is admitted for example via the test plate. The air pressure is increased until the valve member 58 lifts, and the pressure is then gradually reduced. The pressure at which the valve member 58 reseats is noted, and the handwheel 63 is fitted to the stem 65 with the appropriate graduation corresponding to the reseat pressure aligned with the locking plate 66. Settings of the pressure maintaining valve 48 are checked to ensure the handwheel is correctly positioned on the stem 65 to which it is then secured. After completion of the electrical connections for the coil 40 and the microswitch M, the wheel half is then balanced. A further balancing will be carried out, as is customary, when the wheel half 21 is assembled to a wheel half as 22 and the tire is fitted.

The operation of the valves will now be described and this will then be related to the electrical circuit of FIGURE 5 which controls the operation of the valves.

As an example, suppose that a tire T on the wheel 20 is inflated to a high pressure, for example 60 p.s.i., for operation of the aircraft from a prepared runway, and it is desired to land the aircraft on an unprepared landing strip and that, to accomplish the landing under the loading conditions of the aircraft, a tire pressure of 40 p.s.i. is required, i.e. to allow a tire deflection which will provide sufficient tire bearing area to ensure that the wheels do not substantially penetrate the surface of the strip on landing: Before take-off from the prepared runway, the screw 67 is slackened to allow the plate 66 to lift and release the handwheel 63. The handwheel 63 is rotated until the 40 p.s.i. graduation is opposite the plate 66, and the screw 67 is then secured so that the plate 66 now locks the handwheel at the desired setting. Rotation of the handwheel 63 rotates the seat member 49 and the valve member 58, through the driving pegs 59a.

The flanged member 57 has screw threaded engagement with the valve member 58 but is prevented from rotating by the splines 56; consequently, it will move up or down the stem 58a of the valve member 58 to increase or decrease the loading of spring 59. As described, the loading of spring 59 has now been adjusted so that valve member 58 will reseat when a pressure of 40 p.s.i. is attained in chamber 60b.

As the aircraft nears its destination, the pilot energises the coil 40 of the solenoid operated valve 33, causing the valve member 36 to lift away from the seat member 34 and admit the tire inflation pressure to the port 52 of the pressure maintaining valve 48, via the filter 31, the passage 30, the chamber 32, the ports 35, 44, the drilling 46, the annular passage 45 and the drillings 47, 51. Since this pressure is in excess of 40 p.s.i. the valve member 58 lifts and remains open, the valve stem area being greater than the area of port 52. Air from the tire is permitted to escape to atmosphere through the drilling 60a and the filter 62 into the wheel ventilation space 61. The lifting of the valve member 58 causes closure of the contacts of the microswitch M as has been described.

The pressure maintaining valve 48 remains open until the tire pressure has dropped to 40 p.s.i. and then the spring 59 overcomes the air pressure in the chamber 60b, thereby restoring the valve member 58 to its seat and allowing the contacts of the microswitch M to open. The opening of the contacts of the microswitch M is arranged to de-energise the coil 40 of the solenoid valve 33, so that the valve member 36 is restored to its seat, sealing the air pressure in the tire at the new level of 40 p.s.i.

Figure 5:
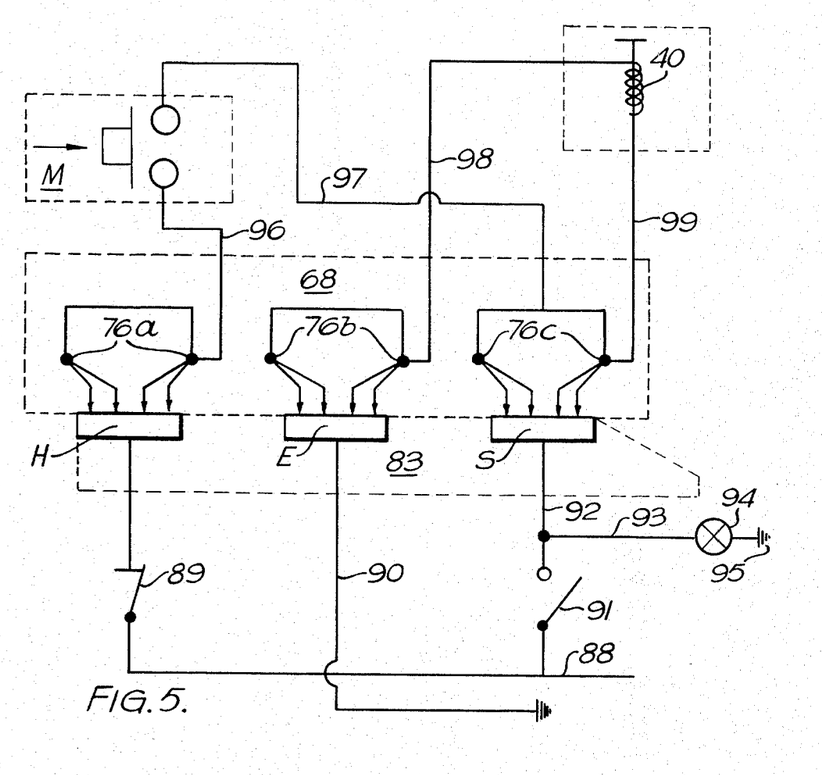

Referring now to FIGURE 5, a conductor 88 connects the positive terminal of an electrical power supply in the aircraft to the slip ring H via the contacts of a control switch 89. A conductor 90 connects the slip ring E to earth. The contacts of a control switch 91 and a conductor 92 connect the conductor 88 to the slip ring S. A further conductor 93 connects the dead side of the switch 91 to one side of a lamp 94 provided in the aircraft cockpit, the other side thereof being connected to earth at 95. Each set of brushes 76a, 76c, which bear on slip rings H and S respectively, is connected to one contact of the microswitch M by conductors 96 and 97 respectively. The set of brushes 76c is also connected to one end of the coil 40 by a conductor 99 and the other end of the coil 40 is connected to the set of brushes 76b by a conductor 98.

The switch 89 is normally closed whereas the control switch 91 is normally open. When the pilot or operator wishes to deflate his tires to the predetermined setting, he closes the switch 91 for a short interval of time, thus completing a circuit from conductor 88 through the control switch 91, the conduit 92, the slip ring S, the brushes 76c, the conductor 99, the solenoid coil 40, the conductor 98, the brushes 76b, the slip ring E and the conductor 90 to earth. Consequent energisation of the solenoid coil 40 causes the valve member 36 to lift off its seat to admit the tire pressure to the port 52 of the pressure maintaining valve 48. Simultaneously, a further circuit is completed from the conductor 88 through the control switch 91, the conductor 93 and the lamp 94 to earth, thereby causing the lamp 94 to light so providing an indication to the pilot that the tire controlled by control switch 91 is deflating. Since the tire pressure at the port 52 is in excess of the setting of the pressure maintaining valve 48, the valve member 58 lifts, causing closure of the contacts of the microswitch M which then provides a holding circuit to maintain energisation of the solenoid coil 40, after release of the control switch 91, via the conductor 88, the switch 89, the slip ring H, the brushes 76a, the conductor 96, the microswitch M, the conductors 97, 99, the solenoid coil 40, the conductor 98, the brushes 76b, the slip ring E and the conductor 90 to earth. It will also be seen that this holding circuit also maintains the circuit to the lamp 94 via the brushes 76c, the slip ring S and the conductors 92, 93. The pressure maintaining valve 48 remains open until the tire pressure has reduced to the setting made by the handwheel 63, for example 40 p.s.i., and when this pressure is reached, the valve 48 shuts to prevent further tire deflation and also allows the contacts of the microswitch M to open. The holding circuit for the solenoid coil 40 and the lamp 94 now breaks, causing the solenoid operated valve 33 to close and the lamp 94 to be extinguished. The new (deflated) tire pressure, for example 40 p.s.i., is now sealed in the tire by the valves 33 and 48 in series as a safeguard against malfunctioning of either valve, and the extinguishing of the lamp 94 indicates to the pilot that deflation to and sealing at the new pressure has been completed.

It will, of course, be appreciated that the apparatus described will be duplicated for each tire to be deflated, although it may be convenient to provide one control switch as 91 which will initiate deflation of all tires. If, after selecting deflation of the tires, the pilot observes that one lamp, as 94, fails to extinguish thereby indicating that the pressure maintaining valve 48 on the associated wheel has failed to close, he can open the switch 89 in that circuit, thus breaking that holding circuit and causing the solenoid valve 33 for that wheel to close so as to prevent further deflation of that tire.

Attention is now drawn to specific advantageous features incorporated in the apparatus described. It is highly desirable that apparatus such as that described should not interfere with or make more difficult routine servicing of wheels, tires and brakes. Water, slush, mud and the like is thrown up with considerable force when an aircraft is landing and taking off and it is therefore most important that maximum protection from the elements should be provided. Accordingly, it is preferred that both the solenoid valve and the pressure maintaining valve (or relief valve) should be accommodated in one wheel half and that these and the associated electrical controls should not be disturbed during the said routine servicing. Similarly the usual anti-skid detector, see 96, FIGURE 3(a), frequently accommodated in the wheel axle, should not be disturbed. It is preferred that the inner wheel bearing, that is, the wheel bearing remote from the end of the wheel axle over which the wheel is withdrawn for servicing, should be of the split type whereby the outer race alone is withdrawn with the wheel so that it can pass with clearance over the slip ring assembly, thus avoiding the necessity of an excessively large inner wheel bearing. Preferably, means are provided whereby grease for lubricating the wheel bearings is excluded from the slip ring assembly.

It will be appreciated that controlled deflation of an aircraft tire can take an appreciable period of time because of the large volume of air to be expelled, and consequently, if a solenoid valve is used, the coil requires to be energised, and therefore, it is a preferred feature of this invention that a metallic heat conduction path be provided between the solenoid coil and the valve port(s) across which expansion of the escaping air takes place so that the refrigerating effect of the air due to expansion is utilised in the cooling of the solenoid coil, thereby permitting the use of a smaller, more compact coil than would other-wise be necessary. As a corollary to this, it will be appreciated that the heating effect of the solenoid coil assists in preventing icing in the expansion port(s) in the event of moisture being present in the air released from the tire.

Considering now the design of the solenoid valve and the pressure maintaining valve, these are preferably arranged so as to have closure members which are arranged substantially radially within the wheel and lifting inwardly towards the wheel axle for opening. This provides an additional safety feature in that centrifugal force acts to retain the valve members in their closed positions when the wheel is spinning thus assisting to prevent inadvertent deflation of the tire when the aircraft is taking-off, landing or manoeuvring on the ground. The valves are preferably arranged diametrically opposite one another so that when the wheel is subjected to a high positive or negative acceleration the acceleration force will act on one valve to keep it closed. The valves are preferably arranged as close as possible to the wheel axis so as to minimise any adverse affects due to positive and negative accelerations induced by anti-skid actions. As a further safety feature the brushes, which bear on the slip rings are provided with weights, such as stops 80, so that when the wheel spins at more than a predetermined speed the brushes are lifted from the slip rings by centrifugal force thus electrically isolating the solenoid valve. As a further preferred feature the electrically live slip ring H is the inner ring—that is, the slip ring remote from the free end of the axle—so that it is not traversed by any of the brushes associated with the other slip rings whereby the solenoid valve might be energised during wheel removal or replacement.

Preferably the adjusting mechanism for the valve 48 is accessible through or in a hole which provides ventilation for the wheel.

What is claimed is:

1. A dynamically balanced aircraft wheel and tire assembly comprising tire deflating control means for effecting deflation of the tire to a predetermined pressure and including a first normally closed fluid control valve and a second normally closed fluid control valve both mounted on the wheel and being connected in series with each other and connecting the tire pressure chamber to atmosphere; solenoid activated operator controlled means selectively operable for effecting opening of said valves for partially deflating said tire; and means for closing at least one of said valves when the tire pressure has been reduced to a predetermined pressure.

2. An aircraft wheel and tire assembly as claimed in claim 1 in which in at least one of said valves, a valve member is provided, said valve member being mounted for movement towards and away from an axle on which said wheel is mounted to open and close, respectively, the fluid path through the one valve, the arrangement being such that centrifugal force urges said valve member to its closed, seated position when the wheel rotates.

3. An aircraft wheel and tire assembly as claimed in claim 2, in which said first and second fluid control valves are mounted within the wheel hub.

4. An aircraft wheel and tire assembly as claimed in claim 1, in which said second fluid control valve comprises a solenoid operated control valve having an inlet port and an outlet port, said inlet port being connected to a pressure chamber of the tire and said outlet port being in fluid communication with the inlet of said first fluid control valve.

5. An aircraft wheel and tire assembly as claimed in claim 4, in which a metallic heat conducting path is provided in the solenoid operated control valve between the valve seat and the solenoid coil.

6. An aircraft wheel and tire assembly as claimed in claim 1, in which said first fluid control valve is an adjustable pressure maintaining valve, and comprises a housing, a seat member, passage means within said member adapted to connect said first valve inlet to atmosphere, a valve plunger mounted within said housing, only for sliding movement towards and away from said seat member, a spring device biasing said valve plunger into a closed position on said seat member, thereby preventing communication between said inlet and said passage means, a graduated setting member to adjust the loading of said spring device, and means for locking the adjustment of said setting member.

7. An aircraft wheel and tire assembly as claimed in claim 6, in which said setting member comprises a handwheel graduated in pressure units, said handwheel being rotatably mounted for adjustment about an axis coaxial with that of said plunger, on the same side of the aircraft wheel as an inflation connection for the tire, and being attached to said valve seat member.

8. An aircraft wheel and tire assembly as claimed in claim 6 and including a hollow chamber within said housing, spline means in the periphery of said hollow chamber, a flange member screw-threadedly engaged with that part of said plunger within said hollow chamber, and spline means on the peripheral surface of the flange of said flange member and adapted to co-operate with the spline means in said hollow chamber.

9. An aircraft wheel and tire assembly as claimed in claim 8 including a solenoid for operating said second fluid control valve and further comprising a microswitch in circuit with said solenoid and being associated with said first fluid pressure maintaining control valve for operation thereby, and a cam portion on the stem of said valve plunger, which cam portion is adapted to operate said microswitch whenever said plunger is in its open position, thereby maintaining said solenoid operated control valve in the open position.

10. An aircraft wheel and tire assembly as claimed in claim 4, and further comprising means in circuit with the solenoid of said solenoid operated control valve including a slip ring assembly on the wheel axle, and co-acting brushes secured to said wheel whereby an electrical feed is provided to said solenoid, each co-acting brush having sufficient mass whereby, above a speed of rotation of said wheel which speed is substantially less than the speed of the wheel at take-off of the aircraft, each brush lifts from its slip ring.

11. An aircraft wheel and tire assembly as claimed in claim 10, in which said slip ring assembly comprises three slip rings mounted on an electrically insulated sleeve on said wheel axle and including means for excluding wheel lubricating grease from the said slip rings.

12. An aircraft wheel and tire assembly as claimed in claim 10 in which said first fluid control valve is an adjustable pressure maintaining valve, further in which there is a microswitch operable in response to operation of said pressure maintaining valve, further in which there are three of said slip rings and co-acting brushes, and further in which said solenoid operated fluid control valve selectively connects said adjustable fluid pressure maintaining valve to the inside of the tire, said assembly including an electrical connection to each slip ring passing through the wheel axle for connection to an electrical power source in the aircraft, said solenoid being connected across a first and a second of the slip rings by the associated brushes and electrical conductors, the third slip ring being connected both to one of the other slip rings via the associated brush or brushes, said microswitch and electrical conductors, and to an electrical power source via a normally open switch, the other of said first and second slip rings being connected back to the electrical power source, and including an indicating lamp connected to said electrical power via said normally open switch when said switch is operated to the closed position.

13. An aircraft wheel and tire assembly comprising tire deflating control means for effecting deflation of the tire to a predetermined pressure and including a first normally closed fluid control valve mounted on said wheel and having a movable valve element responsive to rotation of said assembly for being urged centrifugally toward closed position; a second normally closed fluid control valve mounted on said wheel and having a movable valve element responsive to rotation of said assembly for being urged centrifugally to closed position, said first and second valves being in series with each other and connecting the tire pressure chamber to exhaust; operator controlled means selectively operable for effecting opening of said valves for partially deflating said tire; and means for closing at least one of said valves when the tire pressure has been reduced to said predetermined pressure.

14. An assembly according to claim 13 in which said first normally closed fluid control valve is openable in response to fluid pressure applied to said movable element thereof, and further in which said second normally closed fluid control valve is connected in fluid flow relation between said tire pressure chamber and said first normally closed fluid control valve, the movable element of said second normally closed fluid control valve being movable to open position by operation of said operator controlled means for thereby effecting application of fluid pressure to the movable element of said first normally closed fluid control valve to open the latter and place the tire pressure chamber in communication with exhaust.

References Cited
UNITED STATES PATENTS

| | | | |
|---|---|---|---|
| 2,737,223 | 3/1956 | Plath | 152—415 |
| 3,099,309 | 7/1963 | Horta et al. | 152—416 |
| 3,113,432 | 12/1963 | Watson | 137—614.19 X |

ARTHUR L. LA POINT, *Primary Examiner.*

C. W. HAEFELE, Y. P. SCHAEVITZ,
*Assistant Examiners.*